United States Patent [19]
Adams

[11] Patent Number: 5,410,774
[45] Date of Patent: May 2, 1995

[54] PORTABLE VEHICLE WINDOW WIPER

[76] Inventor: Macie G. Adams, 15923 Blythe St., Van Nuys, Calif. 91406-1811

[21] Appl. No.: 183,866

[22] Filed: Jan. 21, 1994

[51] Int. Cl.⁶ .............. B60S 1/04; B60S 1/18; B60S 1/56
[52] U.S. Cl. .................. 15/250.3; 15/250.31; 15/250.11; 15/250.001; 248/206.5; 224/901
[58] Field of Search ......... 15/250.3, 250.003, 250.001, 15/250.1, 250.11, 250.18, 250.19, 250.31, 250.16, 250.34; 296/96.17, 96.15; 248/683, 684, 206.5, 349.1; 224/42.46 R, 901

[56] References Cited
U.S. PATENT DOCUMENTS

| | | | |
|---|---|---|---|
| 1,659,219 | 2/1928 | Shaw et al. | 15/250.3 |
| 1,796,223 | 3/1931 | Strang | 15/250.31 |
| 3,482,910 | 12/1969 | Debelius | 248/206.5 |
| 4,027,354 | 6/1977 | Burpee | 15/250.30 |
| 4,316,303 | 2/1982 | Penn | 15/250.30 |
| 5,083,733 | 1/1992 | Marino et al. | 248/206.5 |
| 5,150,497 | 9/1992 | Preik | 15/250.1 |
| 5,274,875 | 1/1994 | Chou | 15/250.19 |

FOREIGN PATENT DOCUMENTS 30211  12/1925  France ................. 15/250.3

Primary Examiner—David A. Scherbel
Assistant Examiner—Gary K. Graham

[57] ABSTRACT

A portable window wiper for attachment to a vehicle door to reciprocally clear moisture from an adjacent window. The wiper includes a housing having a bracket projecting therefrom which may be inserted between a base of the window and an adjoining portion of the vehicle door. An electric motor in selective communication with a vehicle lighter socket reciprocates a wiper arm across the window. A wiper blade is pivotally mounted to the wiper arm to effect the cleaning and clearing of the window surface. The device permits the driver of a truck vehicle or the like to see the side view mirrors clearly during forward operation and backing of the vehicle.

4 Claims, 3 Drawing Sheets

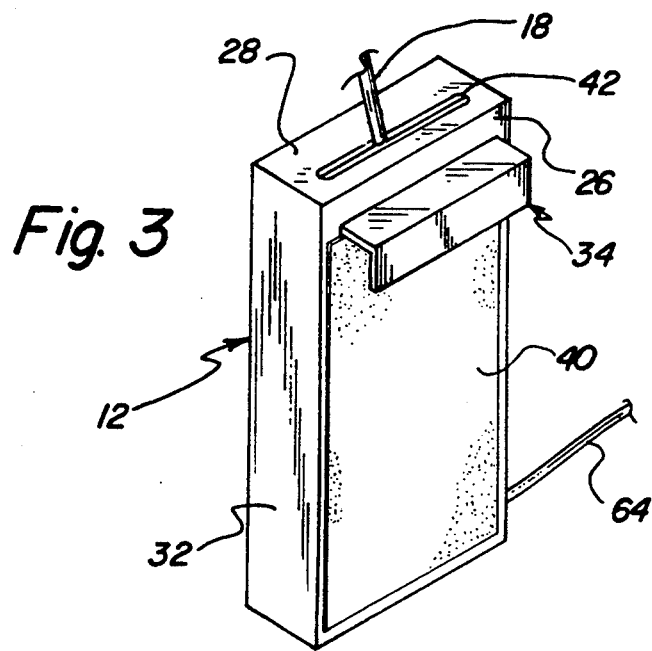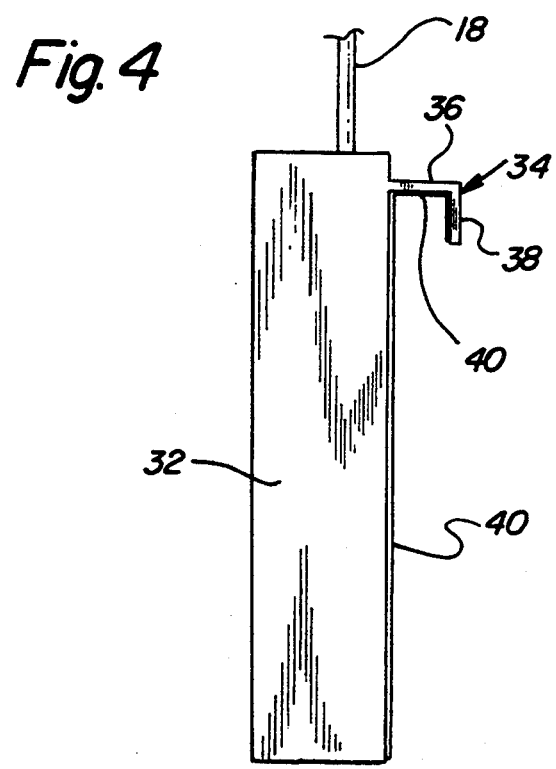

PORTABLE VEHICLE WINDOW WIPER

BACKGROUND OF THE INVENTION

1. Field of the Invention

The present invention relates to wipers and more particularly pertains to a portable vehicle window wiper for attachment to a vehicle door to reciprocally clear moisture from an adjacent window.

2. Description of the Prior Art

The use of wipers is known in the prior art. More specifically, wipers heretofore devised and utilized for the purpose of clearing moisture from a section of glass material are known to consist basically of familiar, expected and obvious structural configurations, notwithstanding the myriad of designs encompassed by the crowded prior art which have been developed for the fulfillment of countless objectives and requirements.

For example, a windshield wiper assembly is illustrated in U.S. Pat. No. 5,068,942 which consists of an endless belt positioned beneath a windshield with the belt extending substantially the length of the windshield and supporting a wiper mounted to an inner side of the belt. A drive is provided for continuously rotating the belt to cause a blade held by the mounting to rapidly move back and forth across the entire windshield.

Another patent of interest is U.S. Pat. No. 4,527,301 which teaches a side view mirror truck windshield wiper for extended side view mirrors on trucks or the like. The windshield wiper utilizes a pneumatic cylinder supported on a wiper support frame to effect a reciprocal movement of a wiper blade connected thereto. The wiper support frame is connected with the mirror in a co-planar relation and may be used as a handle to adjust the mirror as the mirror and wiper support frame are secured together as a unit.

Other known prior art wipers include U.S. Pat. No. 4,736,485; U.S. Pat. No. 5,140,241; and Design U.S. Pat. No. 331,556.

While these devices fulfill their respective, particular objectives and requirements, the aforementioned patents do not disclose a portable window wiper for attachment to a vehicle door to reciprocally clear moisture from an adjacent window that includes a housing having a bracket projecting therefrom which may be inserted between a base of the window and an adjoining portion of the vehicle door, with an electric motor operable to reciprocate a wiper arm and its associated windshield wiping blade across the window.

In these respects, the portable vehicle window wiper according to the present invention substantially departs from the conventional concepts and designs of the prior art, and in so doing provides an apparatus primarily developed for the purpose of reciprocally cleaning and clearing moisture from an adjacent window.

SUMMARY OF THE INVENTION

In view of the foregoing disadvantages inherent in the known types of wipers now present in the prior art, the present invention provides a new portable vehicle window wiper construction wherein the same can be utilized for cleaning and clearing a vehicle side window. As such, the general purpose of the present invention, which will be described subsequently in greater detail, is to provide a new portable vehicle window wiper apparatus which has many of the advantages of the wipers mentioned heretofore and many novel features that result in a portable vehicle window wiper which is not anticipated, rendered obvious, suggested, or even implied by any of the prior art wipers, either alone or in any combination thereof.

To attain this, the present invention generally comprises a portable window wiper for attachment to a vehicle door to reciprocally clear moisture from an adjacent window. The wiper includes a housing having a bracket projecting therefrom which may be inserted between a base of the window and an adjoining portion of the vehicle door. An electric motor in selective communication with a vehicle lighter socket reciprocates a wiper arm across the window. A wiper blade is pivotally mounted to the wiper arm to effect the cleaning and clearing of the window surface. The device permits the driver of a truck vehicle or the like to see the side view mirrors clearly during forward operation and backing of the vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable vehicle window wiper apparatus which has many of the advantages of the wipers mentioned heretofore and many novel features that result in a portable vehicle window wiper which is not anticipated, rendered obvious, suggested, or even implied by any of the prior art wipers, either alone or in any combination thereof.

It is another object of the present invention to provide a new portable vehicle window wiper which may be easily and efficiently manufactured and marketed.

It is a further object of the present invention to provide a new portable vehicle window wiper which is of a durable and reliable construction.

An even further object of the present invention is to provide a new portable vehicle window wiper which is susceptible of a low cost of manufacture with regard to both materials and labor, and which accordingly is then susceptible of low prices of sale to the consuming public, thereby making such portable vehicle window wipers economically available to the buying public.

Still yet another object of the present invention is to provide a new portable vehicle window wiper which provides in the apparatuses and methods of the prior art some of the advantages thereof, while simultaneously overcoming some of the disadvantages normally associated therewith.

Still another object of the present invention is to provide a new portable vehicle window wiper for attachment to a vehicle door to reciprocally clear moisture from an adjacent window.

Yet another object of the present invention is to provide a new portable vehicle window wiper which includes a housing having a bracket projecting therefrom which may be inserted between a base of the window and an adjoining portion of the vehicle door, with an electric motor mounted within the housing and operable to effect selective reciprocation of a wiper arm and an associated wiper blade across the window to effect the cleaning and clearing of the window surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a further isometric illustration of the invention.

FIG. 4 is a side elevation view of the invention detailing a suspension bracket forming a portion thereof.

DESCRIPTION OF THE PREFERRED EMBODIMENT

Figure 1:
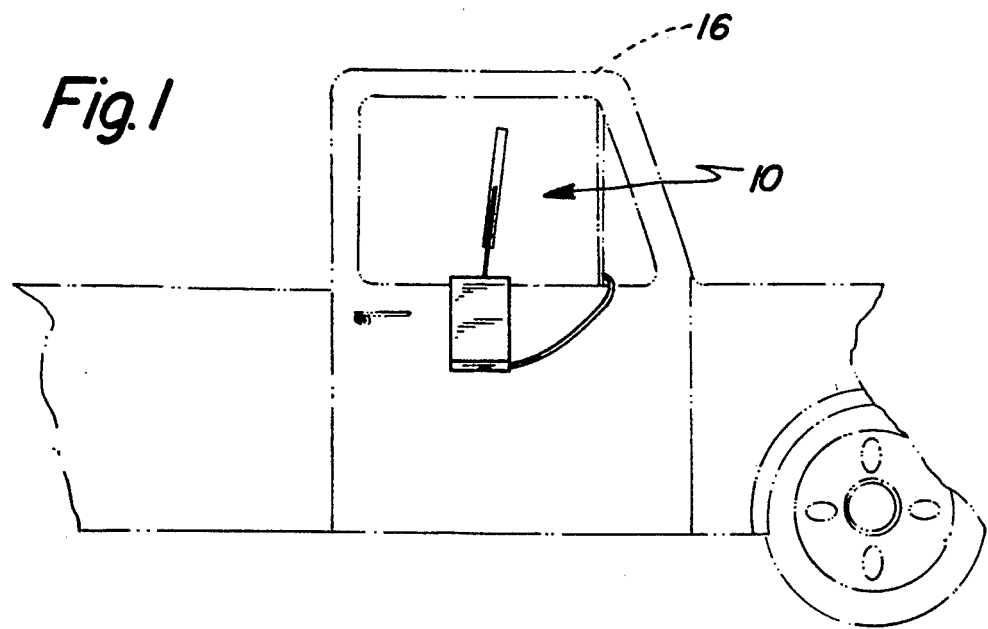
FIG. 1 is a side elevation view of a new portable vehicle window wiper comprising the present invention as installed upon a vehicle.
Figure 2:
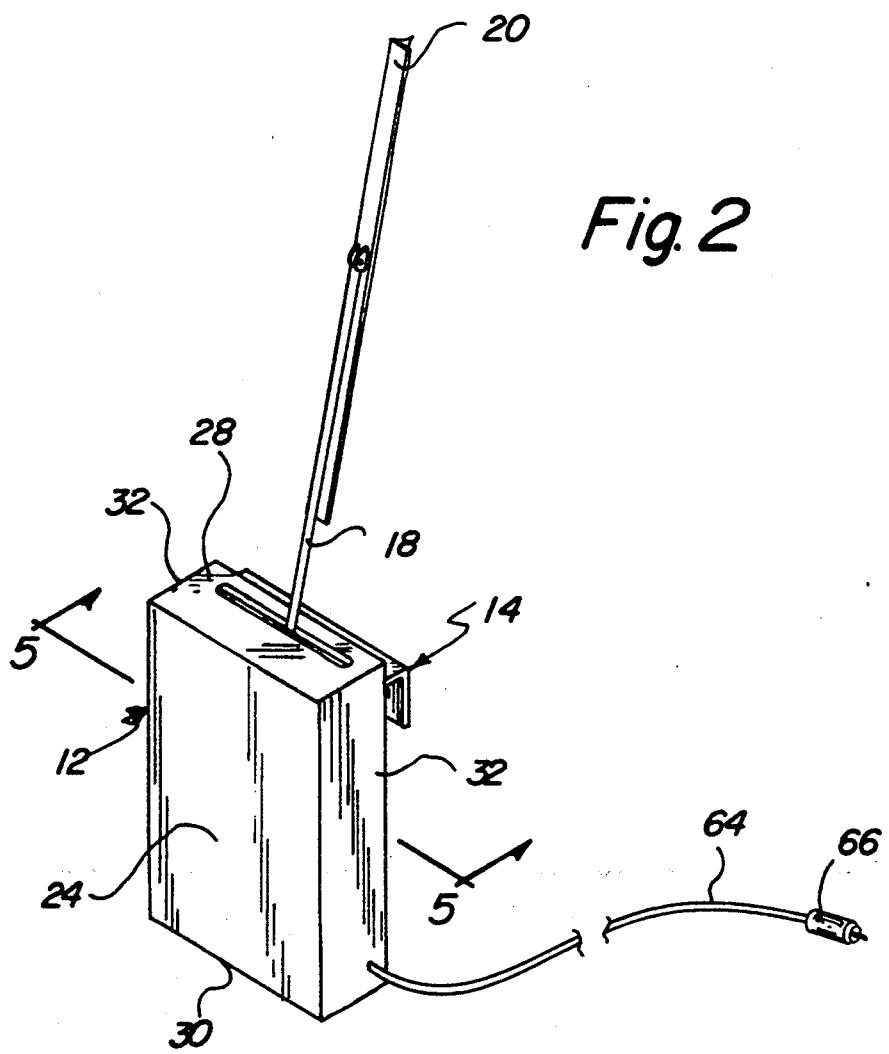
FIG. 2 is an isometric illustration of the present invention.

With reference now to the drawings, and in particular to FIGS. 1-6 thereof, a new portable vehicle window wiper embodying the principles and concepts of the present invention and generally designated by the reference numeral 10 will be described.

From an overview standpoint, the portable vehicle window wiper 10 generally comprises a housing 12 having a substantially rectangular shape. A suspension bracket 14 is secured to a back side of the housing 12 and may be inserted between a base of the window and an adjoining portion of vehicle door to releasably mount the device 10 to a vehicle 16, as illustrated in FIG. 1.

Figure 5:
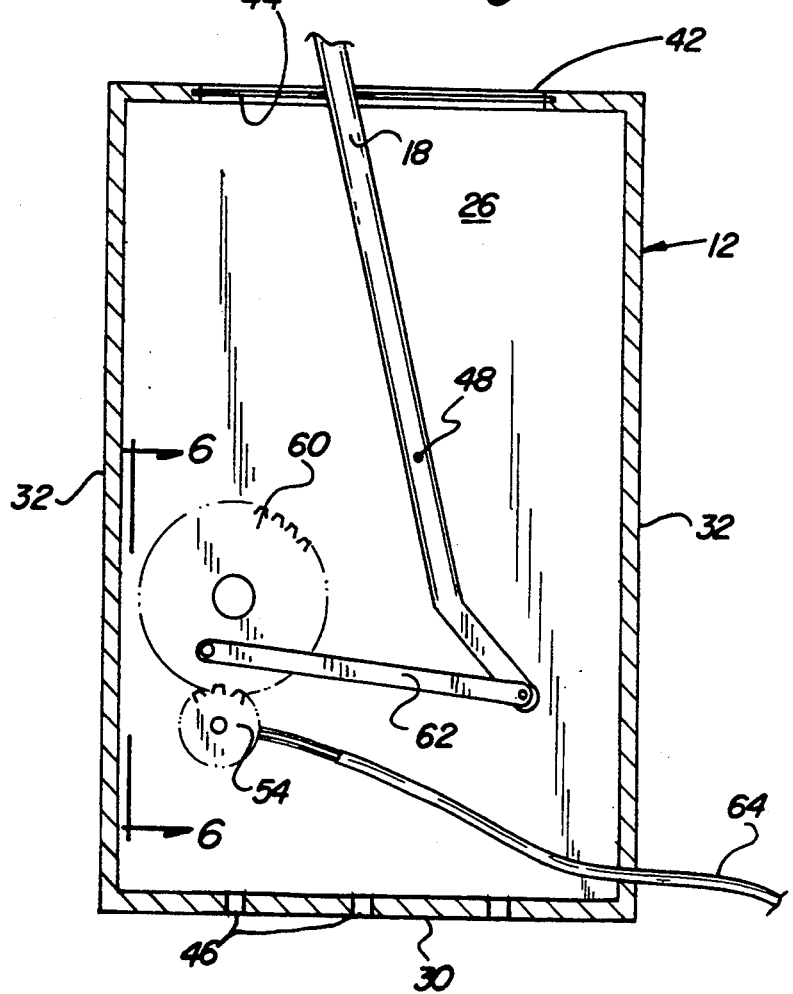
FIG. 5 is a cross sectional view taken along line 5—5 of FIG. 2.
Figure 6:
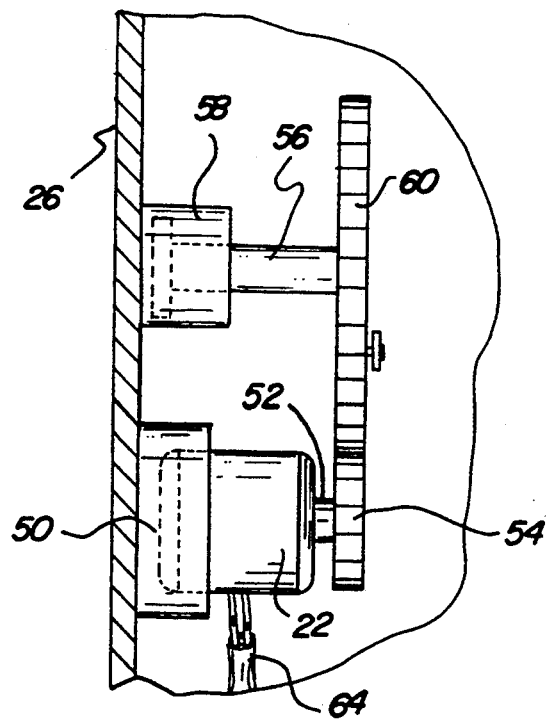
FIG. 6 is a further cross sectional view taken along line 6—6 of FIG. 5.

A wiper arm 18 projects from the housing and pivotally supports a wiper blade 20 thereon. As best illustrated in FIGS. 5 and 6, the wiper arm 18 extends into the housing 12, whereby a motor 22 effects a repetitive pivoting of the wiper arm through a mechanical linkage.

In use, the portable vehicle window wiper 10 may be easily attached to the vehicle 16, such as a truck, van, or the like, in a position adjacent to a window of the vehicle such that the wiper blade 20 contacts the window surface. The device 10 permits a driver of the vehicle 16 to see the side view mirrors clearly during forward operation and backing of the vehicle. The window wiper 10 is particularly useful to novice drivers of rental trucks and the like.

More specifically, it will be noted that the portable vehicle window wiper 10 comprises a housing 12 having a front wall 24 spaced from a rear wall 26, and a top wall 28 spaced from a bottom wall 30, with opposed, spaced side walls 32. The walls 24-32 cooperate to define a substantially rectangularly-shaped, parallelpiped enclosure.

As best illustrated in FIGS. 3 and 4, the housing 12 is provided with a suspension bracket 34 located proximate an upper end of the rear wall 26. The suspension bracket 34 comprises a first bracket member 36 which is integrally or otherwise fixedly secured to the rear wall 26 and arranged to project substantially orthogonally and outwardly therefrom. The suspension bracket 34 further comprises a second bracket member 38 which is substantially orthogonally mounted to a distal end of the first bracket member 36. The bracket members 36, 38 cooperate to define the substantially L-shaped suspension bracket 34. In the preferred embodiment, the suspension bracket 34 is comprised of a substantially resiliently deformable material, such as spring metal or the like, which allows for a resilient pivoting of both the second bracket member 38 with respect to the first bracket member 36 and the first bracket member 36 with respect to the rear wall 26. Such resilient pivoting of the members 36, 38 allows the suspension bracket 34 to fit within the various clearances provided between a base of the window and an adjoining portion of the vehicle door in different vehicles.

FIG. 3 further illustrates that the rear wall 26 of the housing 12 is provided with an interface material 40 which is substantially co-extensive with the rear wall and which provides a surface suitable for contacting an exterior of the vehicle 16. The interface material 40 may be formed of a resilient protective material, such as foam rubber or the like. However, the preferred embodiment of the present invention 10 desires an interface material 40 formed of a substantially magnetic material which will further enhance the mounting of the housing 12 to the associated vehicle 16. In addition, an even more preferable configuration of the present invention 10 utilizes a resilient magnetic material for the interface material 40 such that the benefits of both the cushioning effect of the resilient material and the increased securement of the magnetic material are obtained. Further, and upon close inspection of FIG. 4, it can be seen that the interface material 40 continues from the rear wall 26 upon interior portions of both of the bracket members 36, 38.

The top wall 28 of the housing 12 is provided with an elongated slot 42 through which a wiper arm 18 projects from an interior of the housing to a position overlying the window of the vehicle 16. The wiper arm 18 is provided with a wiper blade 20 which is pivotally mounted at a distal end thereof. As best illustrated in FIG. 5, a seal 44 circumscribes the elongated slot 42 and serves to preclude an entrance of moisture into the housing 12. However, in case of such entrance of moisture within the housing 12, a plurality of drain holes 46 are provided in the bottom wall 30.

The wiper arm 18 is pivotally mounted to the rear wall 26 by a pivot pin 48 located proximate a centroid of the rear wall. The wiper arm 18 is operable to pivotally reciprocate about the pivot pin 48 to effect reciprocation of the wiper blade 20 across the window of the vehicle 16 to effect the cleaning and clearing of the window surface. To effect a pivotal motion of the wiper arm 18, a motor 22 is provided. The motor 22 is mounted within a motor mount 50 which is secured to the rear wall 26 of the housing 12, as best illustrated in the cross section illustration of FIG. 6. The motor 22 is provided with a motor shaft 52 upon which a motor gear 54 is mounted.

A wiper gear axle 56 is rotatably supported within a wiper gear axle mount 58 which, in a manner similar to the motor mount 50, is secured to the rear wall 26 of the housing 12. A wiper gear 60 is secured to the wiper gear axle 56 and is positioned in mesh with the motor gear 54, such that a rotation of the motor gear 54 by the motor 22 will subsequently rotate the wiper gear 60. In the preferred embodiment, the wiper gear 60 has a diameter substantially greater than a diameter of the motor gear 54, as best illustrated in FIG. 5.

A link member 62 is pivotally mounted to an eccentric portion of the wiper gear 60 and extends therefrom in a substantially parallel relationship to the rear wall 26. Another end of the link member 62 is pivotally mounted to the wiper arm 18, as best illustrated in FIG. 5. By this structure, a rotation of the wiper gear 60 by the motor gear 54 will impart a reciprocating motion to the wiper arm 18 through the link member 62.

A power cord 64 extends through an unlabeled aperture in the housing 12 and into electrical communication with the motor 22. The power cord 64 is provided with a cigarette lighter plug 66 which may be engaged to an unillustrated cigarette lighter socket within the vehicle 16 to energize the motor 22.

In use, the portable vehicle window wiper 10 may be easily attached to the vehicle 16, such as a truck, van, or the like, in a position adjacent to a window of the vehicle such that the wiper blade 20 contacts the window surface. The device 10 permits a driver of the vehicle 16 to see the side view mirrors clearly during forward operation and backing of the vehicle. The window wiper 10 is particularly useful to novice drivers of rental trucks and the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A portable vehicle window wiper for wiping a window of a vehicle door, said wiper comprising:

a hollow housing having a front wall spaced from a rear wall, a top wall spaced from and parallel to an opposed bottom wall, and a pair of spaced side walls, said top wall having a through-extending elongated aperture formed therein;

a wiper arm pivotally mounted within and to said housing and projecting through said elongated aperture in said top wall, said wiper arm having lower and upper ends thereof;

a wiper blade coupled to said upper end of said wiper arm, said blade being operable to contact said window of said vehicle door;

mounting means for mounting said housing on said vehicle door to place said blade in contact with said window, said mounting means including a suspension bracket mounted to said rear wall of said housing on said rear wall at a position closer to said top wall than said bottom wall, said suspension bracket including a first bracket member extending outwardly from said rear wall from a position between the top and bottom walls and having a distal end; and a second bracket member extending downwardly from said distal end of said first bracket member away from said top wall, towards said bottom wall and substantially parallel to said rear wall, said bracket being operable to be inserted between a window base and an adjoining portion of a vehicle door to releasably secure said housing to said vehicle door;

an interface material coupled to and substantially co-extensive with said rear wall, said interface material extending onto interior surfaces of both said first bracket member and said second bracket member, said interface material comprising a substantially resilient, magnetic material which enhances a mounting of said housing to an associated vehicle; and, means to reciprocate said wiper arm.

2. The portable vehicle window wiper of claim 1, wherein said means to reciprocate comprises a motor mounted within said housing, said motor having a motor shaft; a motor gear mounted to said shaft; an axle rotatably mounted to said housing; a wiper gear mounted to said axle, said wiper gear being in mesh with said motor gear; a link member pivotally coupled to both an eccentric portion of said wiper gear and said lower end of said wiper arm; and a power cord means for electrically coupling said motor to a power source such that a rotation of said motor gear by said motor subsequently rotates said wiper gear and reciprocates said wiper arm through said link member.

3. The portable vehicle window wiper of claim 2, and further comprising at least one drain hole extending through said bottom wall of said housing.

4. A portable vehicle window wiper for wiping a window of a vehicle door, said wiper comprising:

- a hollow housing having a front wall spaced from and oriented parallel to a rear wall, and a top wall spaced from and oriented parallel to a bottom wall, with opposed and parallely spaced side walls extending orthogonally between said front and rear walls and said top and bottom walls, said top wall having a through-extending elongated aperture formed therein;
- a wiper arm pivotally mounted within and to said housing and projecting through said elongated aperture in said top wall, said wiper arm having lower and upper ends thereof;
- a wiper blade coupled to said upper end of said wiper arm, said blade being operable to contact said window of said vehicle door;
- mounting means for mounting said housing on said vehicle door to place said blade in contact with said window, said mounting means including a suspension bracket mounted to said housing on said rear wall at a position closer to said top wall than said bottom wall, said suspension bracket comprising a first bracket member fixedly secured to said rear wall and projecting substantially orthogonally and outwardly therefrom from a position between the top and bottom walls, said suspension bracket further comprising a second bracket member substantially orthogonally mounted to a distal end of said first bracket member, said second bracket member extending downwardly from said distal end of said first bracket member away from said top wall, towards said bottom wall and substantially parallel to said rear wall, said suspension bracket being comprised of a substantially resiliently deformable material which permits a resilient pivoting of both said second bracket member with respect to said first bracket member and said first bracket member with respect to said rear wall, wherein said resilient pivoting of said bracket members permits said suspension bracket to fit within various clearances provided between a base of said window and an adjoining portion of said vehicle door to support said housing relative to said door;
- an interface material coupled to and substantially co-extensive with said rear wall, said interface material extending onto interior surfaces of both said first bracket member and said second bracket member, said interface material comprising a substantially magnetic material which enhances a mounting of said housing to an associated vehicle; and,
- means to reciprocate said wiper arm, said means to reciprocate said wiper arm comprising a motor mounted within said housing, said motor having a motor shaft; a motor gear mounted to said shaft; an axle rotatably mounted to said housing; a wiper gear mounted to said axle, said wiper gear being in mesh with said motor gear; a link member pivotally coupled to both an eccentric portion of said wiper gear and said lower end of said wiper arm; and a power cord means for electrically coupling said motor to a power source such that a rotation of said motor gear by said motor subsequently rotates said wiper gear and reciprocates said wiper arm through said link member.

* * * * *